(12) United States Patent
Kimman et al.

(10) Patent No.: US 9,447,823 B2
(45) Date of Patent: Sep. 20, 2016

(54) ROTARY CONNECTOR FOR A ROTATING SHANK OR AXLE

(71) Applicants: Maarten Hartger Kimman, Delft (NL); Jeroen Paul Van Schieveen, Voorburg (NL)

(72) Inventors: Maarten Hartger Kimman, Delft (NL); Jeroen Paul Van Schieveen, Voorburg (NL)

(73) Assignee: Micro Turbine Technology BV, Eindhoven (NL)

( * ) Notice: Subject to any disclaimer, the term of this patent is extended or adjusted under 35 U.S.C. 154(b) by 101 days.

(21) Appl. No.: 14/076,069

(22) Filed: Nov. 8, 2013

(65) Prior Publication Data

US 2014/0064841 A1    Mar. 6, 2014

Related U.S. Application Data

(63) Continuation-in-part of application No. 13/125,252, filed as application No. PCT/NL2009/050640 on Oct. 23, 2009, now abandoned.

(30) Foreign Application Priority Data

Oct. 23, 2008  (NL) .................................... 2002128

(51) Int. Cl.
| | |
|---|---|
| *F16D 1/06* | (2006.01) |
| *F16D 1/04* | (2006.01) |
| *B23B 31/14* | (2006.01) |
| *F16D 1/08* | (2006.01) |

(52) U.S. Cl.
CPC .................. *F16D 1/04* (2013.01); *B23B 31/14* (2013.01); *F16D 1/0858* (2013.01); *Y10T 403/7061* (2015.01); *Y10T 403/7071* (2015.01)

(58) Field of Classification Search
CPC ...... F16D 1/04; F16D 1/0805; F16D 1/0835; F16D 1/0858; Y10T 403/7071; Y10T 279/24; Y10T 279/247; B23B 31/14
USPC ............ 464/30, 31; 403/203, 366, 367, 372, 403/374.1, 375; 279/103, 129, 131
See application file for complete search history.

(56) References Cited

U.S. PATENT DOCUMENTS

| | | | | |
|---|---|---|---|---|
| 2,828,134 | A * | 3/1958 | Buck et al. .................... | 279/119 |
| 2,982,558 | A * | 5/1961 | Multer .......................... | 279/123 |
| 4,760,301 | A | 7/1988 | Iizima | |
| 5,429,446 | A * | 7/1995 | Challis .......................... | 403/31 |
| 5,845,384 | A * | 12/1998 | Retzbach ....................... | 29/450 |
| 6,227,777 | B1 | 5/2001 | Kosmowski | |
| 7,101,108 | B1 * | 9/2006 | Chuang ......................... | 403/227 |
| 7,217,072 | B1 * | 5/2007 | Haimer ......................... | 409/234 |
| 7,547,168 | B1 * | 6/2009 | Kosmowski .................. | 409/231 |
| 9,050,661 | B1 * | 6/2015 | Kosmowski | |
| 2001/0050466 | A1 | 12/2001 | Tempest | |
| 2002/0152601 | A1 | 10/2002 | Retzbach | |
| 2008/0193201 | A1* | 8/2008 | Kwan et al. .................... | 403/30 |

FOREIGN PATENT DOCUMENTS

DE          4308289 A1 *   9/1993    ............. B60K 17/02

\* cited by examiner

*Primary Examiner* — Michael P Ferguson
*Assistant Examiner* — Matthew R McMahon
(74) *Attorney, Agent, or Firm* — Eric Karich; Karich & Associates

(57) ABSTRACT

A rotary connector has a sleeve body having an end region, an opening, an inner surface with clamping surfaces, spokes, levers acting to press the clamping surface against an axle when the rotary connector is rotating, individual masses forming the outer body of the rotary connector, azimuthal gaps and radial gaps for allowing the individual masses to clamp or release an axle inserted into the rotary connector.

3 Claims, 4 Drawing Sheets

ROTARY CONNECTOR FOR A ROTATING SHANK OR AXLE

CROSS-REFERENCE TO RELATED APPLICATIONS

This application for a utility patent is a continuation-in-part of a previously filed utility patent, still pending, having the application Ser. No. 13/125,252, filed Apr. 20, 2001, which was a National application based upon PCT application number PCT/NL/50640, filed Oct. 23, 2009 (Publication No.: WO 2010/047594).

BACKGROUND OF THE INVENTION

Field of the Invention

The invention relates to a rotary connector for a rotating shank or axle of a machine or similar, comprising at least one sleeve body, with an end region having an opening bounded by a circumferentially closed inner-surface for clampingly accommodating said shank or axle, which opening on its circumferential inner-surface is provided with clamping surfaces for securing the shank or axle with a press fit; and wherein there is a plurality of spokes that extend radially outwards from said sleeve body.

A similar rotary connector is known from U.S. Pat. No. 7,217,072. The known rotary connector is intended for accurate clamping of a rotary tool and allows easy mounting and dismounting of such a rotary tool.

A basic embodiment of the known rotary connector has spokes which at their outwardly directed extremities are connected with an outer circumferential casing. By appropriately pressing on this circumferential casing, the spokes are tensioned so as to release the clamping surfaces from the rotary tool.

U.S. Pat. No. 7,217,072 acknowledges the problem associated with centrifugal forces that occur during rotational operation of the rotary connector or tool holder. These centrifugal forces try to displace the tension spokes in the radially outward direction, as a result of which the accommodating opening would widen radially. This may result in the risk of the press fit on the shank or axle being weakened due to this centrifugal force, and in the worst-case scenario even being lost. A solution for this problem is taught by U.S. Pat. No. 7,217,072 in placing masses at appropriate places in the outer circumferential casing that connects the outwardly extending extremities of the spokes. Thus the centrifugal forces may induce inwardly directed compressive forces to the spokes increasing the press fit when high rotational velocities occur due to the additional masses.

SUMMARY OF THE INVENTION

It is an object of the invention to provide an alternative to the known rotary connector which may be applied at very high rotational speeds.

The rotary connector of the invention is to that end characterized by one or more of the appended claims.

In a first aspect of the invention the rotary connector has spokes that connect to parts of the sleeve body connecting the clamping surfaces, and in that at its radially outer end, each spoke connects to a circumferentially provided individual mass, whereby each individual mass only connects to the sleeve body through said spoke and is free from connections with any other spoke.

By this arrangement the benefit is achieved that the parts of the sleeve body connecting the clamping surfaces act as levers for converting radially outwards directed forces on the spokes to inwardly directed forces exerted by the clamping surfaces. With the connector of the invention the further benefit is achieved that it is possible to fit the shank or axle in the connectors' body manually. This is due to the possibility to apply only a moderate initial clamping force when the connector is still at a standstill.

Beneficially there are three clamping surfaces symmetrically provided along the inner circumference of said opening. This provides the advantage that even without pre-positioning of the shank or axle the three clamping-regions provide clamping-lines that accurately define the position of the shank or axle to be clamped, as opposed to the known construction of U.S. Pat. No. 7,217,072 which requires very accurate pre-positioning of the shank of axle due to the nearly circular clamping-line of the connector's inner surface that presses the shank or axle.

Particularly when applying high rotational speeds it is advantageous that the connector is rotationally symmetric with respect to a central body axis through the connector's sleeve body.

The rotary connector as discussed above may be coupled with another (similar) rotary connector through an intermediate elastic coupling. This is an effective means to link two shanks or axles to each other that have to perform the same rotational motion.

In a further aspect of the invention it is possible that the rotary connector has two sleeve bodies each having an end region with an opening for accommodating a shank or axle, which sleeve bodies preferably share a common central body axis and have oppositely directed openings. Advantageously the said two sleeve bodies are integrally formed.

A further beneficial arrangement is that a separating slot is provided at the connector's inner surface at least in part separating the neighbouring clamping surfaces of said oppositely directed openings. This allows use with different diameters of the axles or shanks that are to be connected to each other.

BRIEF DESCRIPTION OF THE DRAWINGS

The accompanying drawings illustrate the present invention. In such drawings.

DETAILED DESCRIPTION OF THE INVENTION

The invention will hereinafter be further elucidated with reference to an exemplarily embodiment of the rotary connector 1 of the invention and with reference to the drawings.

Figure 1:
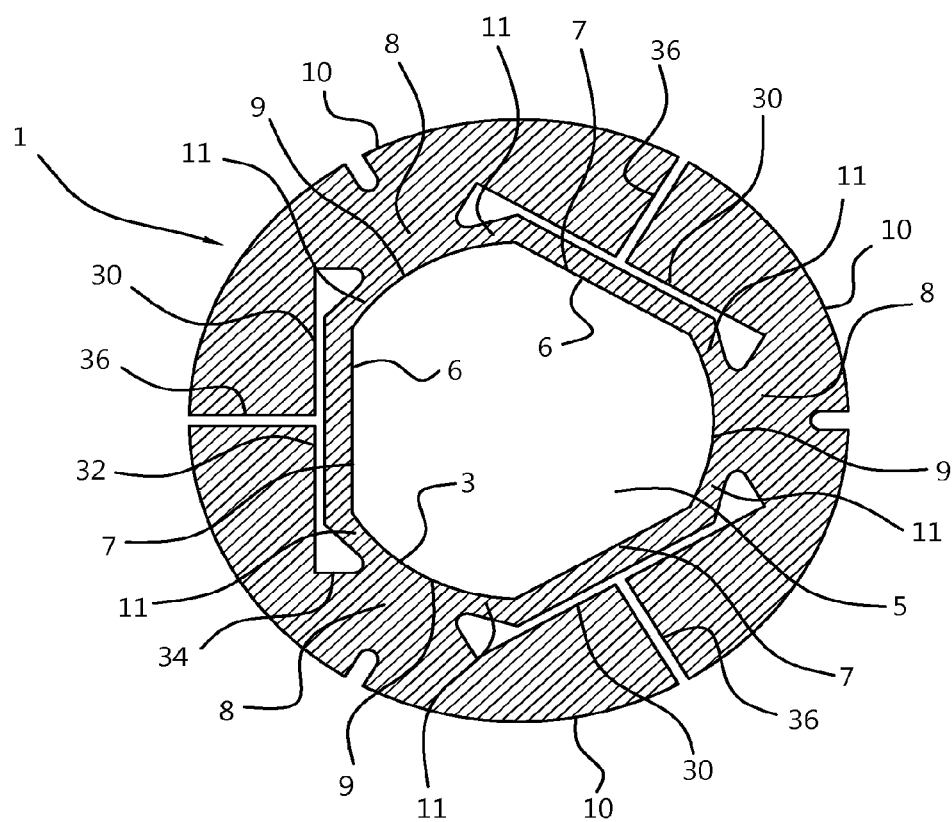
FIG. 1 is a cross-section of the rotary connector of the invention.
Figure 2:
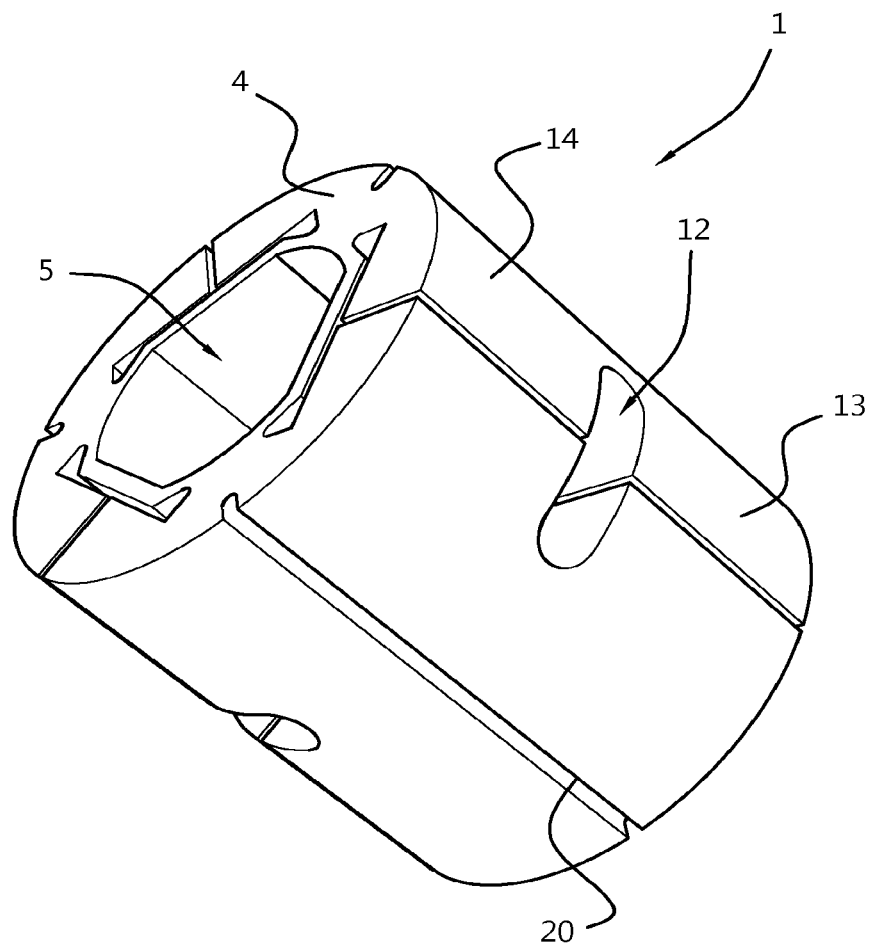
FIG. 2 is an isometric view of the rotary connector of the invention.

FIG. 1 is a cross-section of the rotary connector 1 of the invention. FIG. 2 is an isometric view of the rotary connector 1 of the invention.

FIG. 1 shows a rotary connector 1 for clamping an axle 2 (shown in FIGS. 3,4) of a machine, the rotary connector 1 having a sleeve body 3, a plurality of spokes 8, a plurality of levers 11, a plurality of individual masses 10, a plurality of azimuthal gaps 30, and a plurality of radial gaps 36.

The sleeve body 3 has an end region 4, an opening 5 in the end region 4 shaped to accommodate the axle 2, and an inner surface 6 having a plurality of expansion regions 9 and a plurality of clamping surfaces 7 for securing the axle 2 with a press fit, particularly at high rotational speeds. The expansion regions 9 are portions of the sleeve body 3 that are at a greater radius from the rotational axis than the clamping surfaces 7. The expansion regions 9 are discussed in greater detail in the discussion of FIG. 4, below. The clamping surfaces of the inner surface 6 are generally planar, for providing a symmetrical grasp on the axle 2, however they may also be of irregular shapes, such as angled for accepting a hexagonal or triangular axle 2 or textured for reducing slippage upon clamping. In the present embodiment, there are three clamping surfaces 7 with three axes of symmetry. In other embodiments, there may be four, five, six, or any number of clamping surfaces 7 as desired by one skilled in the art, for holding an axle 2 in a manner similar to that described herein.

The plurality of spokes 8 extends radially outwards from said sleeve body 3, connecting the individual masses 10 with the sleeve bodies 3. The spokes 8 are for directing inward or outwardly directed forces on the individual masses 10 to the sleeve body 3, in particular to the expansion regions 9.

The levers 11, connect the spokes 8 and the clamping surfaces 7 and act to press the clamping surface 7 against the axle 2 when the rotary connector 1 is rotating. The interplay of forces in clamping and releasing an axle 2 by the rotary connector 1 are discussed in more detail in the discussion of FIGS. 3 and 4, below.

The plurality of individual masses 10 are each connected to the radially outer end of one of the spokes 8. Each individual mass 10 only connects to the sleeve body 3 through the spoke 8. The individual masses 10 are either pushed or pulled radially, either by rotation of the rotary connector 1, or compression to release the axle 2.

The plurality of azimuthal gaps 30 may be formed between the sleeve body 3 and the individual masses 10. The azimuthal gaps 30 are for allowing the sleeve body 3 to deform at the location of the clamping surfaces 7. The gaps may have a planar section 32 and a pair of end sections 34. The planar section 32 may intersect one or more radial gaps 36. The end sections 34 may be shaped to act approximately as a fulcrum of a lever 11 between the clamping surfaces 7 and the spokes 8.

The plurality of radial gaps 36 may be formed between each of the individual masses 10. The radial gaps 36 allow the individual masses 10 to be compressed radially. In the present embodiment, they are generally planar, however the radial gaps 36 may have other shapes, or be not strictly radial, for example they may be angled to favor one direction of rotation.

As shown in FIG. 2, the rotary connector 1 may have a first half 13 and a second half 14, joined to share a common axis of rotation, and having oppositely directed openings 5. The rotary connector 1 may also have a separating slot 12, radially oriented, but with some azimuthal extent, in part separating adjacent clamping surfaces 7 of the sleeve body 3. The separating slot 12 may go all the way through the two individual masses 10 and through the clamping surface 7 of the sleeve body 3. Alternatively, the separating slot 12 may go only through the individual masses 10. In another embodiment, the separating slot 12 may be shallow and not go all the way through the individual masses 10. There may be longitudinal slots 20 that may be used for alignment of the rotary connector 1, in a chuck or other grasping device.

Figure 3:
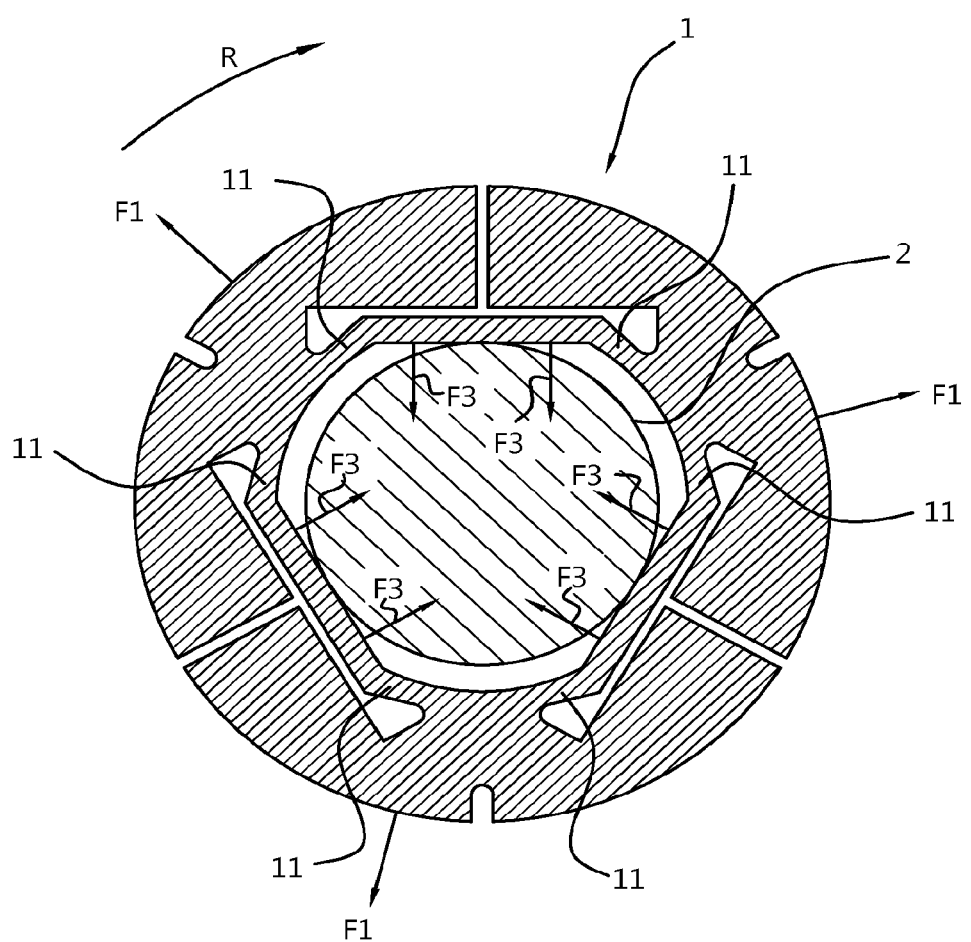
FIG. 3 is a cross-section of the rotary connector illustrating the rotary connector clamping an axle.

FIG. 3 is a cross-section of the rotary connector 1 illustrating the rotary connector 1 clamping an axle 2.

As shown in FIG. 3, when the rotary connector 1 is rotating as shown by the arrow R, the centrifugal outward force F1 pulls radially outward on the spokes 8, causing the clamping surfaces to deform (or attempt to deform) in shape. Because of the shape of the sleeve body 3, particularly where the clamping surfaces 7 and the expansion regions 9 meet, the lever 11 transforms the outward force F1 along the spoke 8 to an inward force F3 at the clamping surfaces 7, increasing the force on the axle 2.

Figure 4:
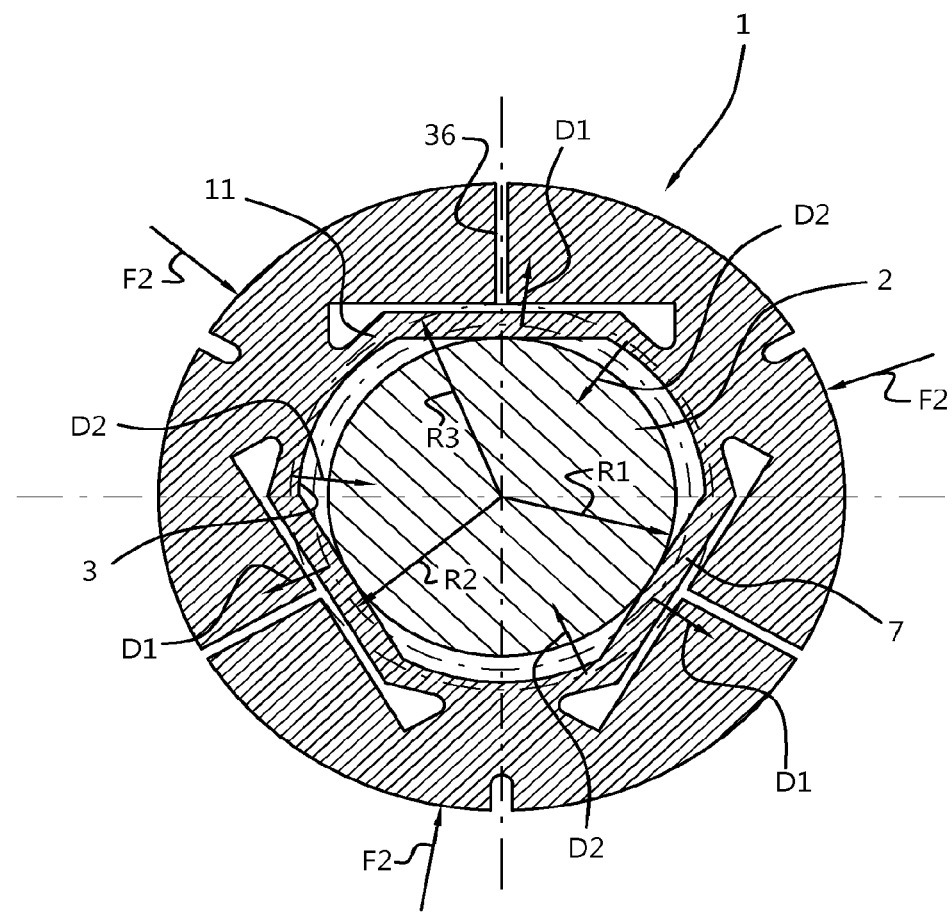
FIG. 4 is a cross-section of the rotary connector illustrating the rotary connector releasing an axle.

FIG. 4 is a cross-section of the rotary connector 1 illustrating the rotary connector 1 releasing an axle 2. As shown in FIG. 4, when radially directed inward forces F2 are applied to the outside of the rotary connector 1, the sleeve body 3 is deformed (as shown by the dashed lines) to release the axle 2. The radius R1 is the radius of the clamping surfaces 7 when no forces are acting on the rotary connector 1.

Due to the lever 11 between the spokes 8 and the clamping surfaces 7, the clamping surfaces 7 experience an outward deflection D1, as shown by the arrow and the dashed line of the clamping surface 7. The outward deflection D1 has a maximum extent defined by the size of the azimuthal gap 30 adjacent to it, which is closed when the sleeve body 3 at the clamping surface 7 reaches an outer radius R3. At this point the radius R1 reaches the maximum radius R2.

The portion of the inner surface 6, that is not a clamping surface 7, experiences an inward deflection D2. However, because of the larger radius of the expansion regions 9, they do not contact the axle 2 and recapture it, thus allowing the axle 2 to be released.

It should also be noted that the inward force F2 pushes the individual masses 10 together, to close the radial gap 36, with another mechanical limit being defined by the width of the radial gap.

We claim:

1. A rotary connector for clamping an axle of a machine, the rotary connector comprising:
 a sleeve body having an inner surface, the inner surface having a plurality of clamping surfaces separated by expansion regions, the clamping surfaces being generally planar in a relaxed configuration, while the expansion regions having an arcuate shape in the relaxed configuration with a greater radius from a rotational axis of the axle than the clamping surfaces, such that the clamping surfaces are adapted to contact the axle for securing the axle, while the expansion regions are adapted to not contact the axle in the relaxed configuration;
 wherein the expansion regions are only connected to the clamping surfaces via levers between the clamping surfaces and the expansion regions;
 a plurality of spokes that extend radially outwards from the sleeve body, wherein the spokes at their radially inner end only connect to the expansion regions, and the spokes and the expansion regions are only connected to the clamping surfaces via the levers;
 a plurality of masses that are each connected only to a radially outer end of one of the spokes, and do not otherwise connect to the sleeve body, the masses being separated from each other by radial gaps, and from the sleeve body by azimuthal gaps; and
 wherein each of the masses extends circumferentially around the adjacent clamping surfaces such that the plurality of masses together form a generally annular shape, with each of the masses having a symmetry that is centered on the one of the spokes to which it is connected so that each of the plurality of masses exerts a force on the one of the spokes that is only directed radially outward when the rotary connector is rotating, thereby causing the levers to press the clamping surfaces against the axle.

2. The rotary connector of claim 1, wherein each of the plurality of levers is shaped such that when the plurality of masses are under compression, the masses are moved radially inward, forcing each of the plurality of levers to move the clamping surfaces outward.

3. A rotary connector for clamping an axle of a machine, the rotary connector comprising:
- a sleeve body having an inner surface, the inner surface having a plurality of clamping surfaces separated by expansion regions, the clamping surfaces being generally planar in a relaxed configuration, while the expansion regions having an arcuate shape in the relaxed configuration with a greater radius from a rotational axis of the axle than the clamping surfaces, such that the clamping surfaces are adapted to contact the axle for securing the axle, while the expansion regions are adapted to not contact the axle in the relaxed configuration;
- wherein the expansion regions are only connected to the clamping surfaces via levers between the clamping surfaces and the expansion regions;
- a plurality of spokes that extend radially outwards from the sleeve body, wherein the spokes at their radially inner end only connect to the expansion regions, and the spokes and the expansion regions are only connected to the clamping surfaces via the levers;
- a plurality of masses that are each connected only to a radially outer end of one of the spokes, and do not otherwise connect to the sleeve body, the masses being separated from each other by radial gaps, and from the sleeve body by azimuthal gaps;
- wherein each of the masses extends circumferentially around the adjacent clamping surfaces such that the plurality of masses together form a generally annular shape, with each of the masses having a symmetry that is centered on the one of the spokes to which it is connected so that each of the plurality of masses exerts a force on the one of the spokes that is only directed radially outward when the rotary connector is rotating, thereby causing the levers to press the clamping surfaces against the axle; and
- a longitudinal slot formed in each of the plurality of masses that is radially spaced from the middle of each of the expansion regions.

* * * * *